United States Patent [19]

Kaminaka et al.

[11] 4,318,148
[45] Mar. 2, 1982

[54] THIN-FILM MAGNETIC HEAD

[75] Inventors: Nobuyuki Kaminaka, Moriguchi; Kenji Kanai, Neyagawa; Norimoto Nouchi, Katano; Noboru Nomura, Kyoto, all of Japan

[73] Assignee: Matsushita Electric Industrial Co., Ltd., Osaka, Japan

[21] Appl. No.: 165,104

[22] Filed: Jul. 1, 1980

[30] Foreign Application Priority Data

Jul. 4, 1979 [JP] Japan .................................. 54-85200

[51] Int. Cl.$^3$ ........................... G11B 5/14; G11B 5/20
[52] U.S. Cl. ..................................... 360/127; 360/123
[58] Field of Search ................. 360/126, 127, 122–123, 360/125

[56] References Cited

U.S. PATENT DOCUMENTS 4,219,854 8/1980 Church et al. ................... 360/125 X
4,241,367 12/1980 Nomura et al. .................. 360/123 X Primary Examiner—John H. Wolff
Attorney, Agent, or Firm—Spencer & Kaye

[57] ABSTRACT

A thin-film magnetic head constructed by depositing a conductor layer formed in a spiral pattern having two or more turns on a magnetic substrate. A non-magnetic insulating layer is then formed to fill the spaces between turns of the conductive layer in such a manner that the thickness of the non-magnetic layer is substantially the same as that of the conductor layer. A further non-magnetic insulating layer and a magnetic layer are formed successively on the non-magnetic layer. A gap is formed on one side of the lamination between the magnetic layer and the magnetic substrate interposing the further non-magnetic insulating layer. A magnetic circuit through the magnetic layer and the magnetic substrate around the conductive layer includes therein the gap.

2 Claims, 9 Drawing Figures

THIN-FILM MAGNETIC HEAD

BACKGROUND OF THE INVENTION

This invention relates to a thin-film magnetic head with coiled conductors.

A prior art thin-film magnetic head of this type comprises, as shown in FIGS. 1 and 2, a magnetic substrate 1, a spiral pattern conductor layer 2 in the form of a three-turn coil laminated, on the surface of the substrate a non-magnetic insulating layer 3 laminated on the conductive layer 2 and the exposed portion of the magnetic substrate 1, and a magnetic layer 4 laminated on the non-magnetic insulating layer. The thin-film magnetic head of the above structure is arranged to establish a magnetic circuit with a gap A formed on one side of the thin-film magnetic head with which a magnetic recording medium (not shown) comes in contact. Reference numeral 5 designates a terminal conductor layer.

However, this prior art thin-film magnetic head disadvantageously has surfce irregularities in the magnetic layer 4 in correspondence with surfaces irregularities in the conductor layer 2 with the result that the cross-sectional area of the magnetic layer 4 is locally reduced and the consequent magnetic saturation during recording decreases the recording efficiency. One countermeasure for preventing the decrease in recording efficiency may be such that the thickness of the magnetic layer 4 is increased so as to enlarge the equivalent cross-sectional area, but such a countermeasure is not always advantageous. More particularly, it is usual to prepare the magnetic layer 4 by vapor deposition in a vacuum at a temperature of 300° to 350° C. and hence high temperature treatment of the lower layers such as conductor layer 2 and non-magnetic insulating layer 3 is prolonged in proportion to the thickness of the magnetic layer 4. As a result, the resistivity of the conductor layer 2 is liable to increase and the insulative properties of the non-magnetic insulating layer 3 are liable to become degraded. Also, with an increased thickness, internal stress in the magnetic layer 4 is increased, resulting in a tendency for the magnetic layer 4 to peel off. Moreover, when etching the magnetic layer 4 to obtain a desired track width, inclination is increased at the edge and it is difficult to provide a narrow track width with high accuracy.

Another prior art thin-film magnetic head, as shown in FIGS. 3 to 5, comprises laminae of a magnetic substrate 6, a spiral pattern conductor layer 7 in the form of a three-turn coil, a non-magnetic insulating layer 8, a spiral pattern conductor layer 9 in the form of a three-turn coil which is in register with the spiral conductor layer 7, a non-magnetic insulating layer 10, and a magnetic layer 11. The spiral pattern conductor layer 7, insulating layer 8, spiral pattern conductor layer 9, insulating layer 10 and magnetic layer 11 are stacked on the magnetic substrate 6 in this order. The magnetic head of the above structure is arranged to establish a magnetic circuit with a gap B formed on one side of the magnetic head with which a magnetic recording medium (not shown) comes in contact. Reference numeral 12 designate an intermediate terminal conductor layer.

The disadvantages of this thin-film magnetic head are the same as those of the former prior art magnetic head and are aggravated by the following problems. More particularly, as shown in FIG. 5, when the conductor layer 9 crosses the conductor layer 7 across a void between two adjacent turns of the conductor layer 7, a bridge portion of the conductor layer 9 crossing the void sinks and causes unevenness in the conductor layer 9. As a result, a cross-sectional area of the conductor layer 9 is locally reduced at portions 9a and 9b. Consequently, the resistances of the conductor layers 7 and 9 are unbalanced and the allowable current for the conductor layer 9 is appreciably reduced. In addition, the conductor layer 9 is liable to be broken at the portions 9a and 9b.

SUMMARY OF THE INVENTION

Accordingly, the object of this invention is to provide a thin-film magnetic head which can eliminate the conventional drawbacks and can improve magnetic head characteristics considerably.

DESCRIPTION OF THE PREFERRED EMBODIMENTS

Figure 1:
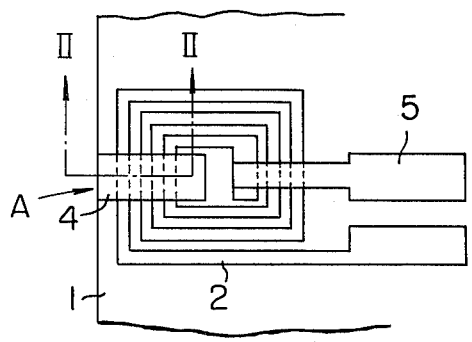
FIG. 1 is a plan view showing a schematic construction of a prior art thin-film magnetic head.
Figure 2:
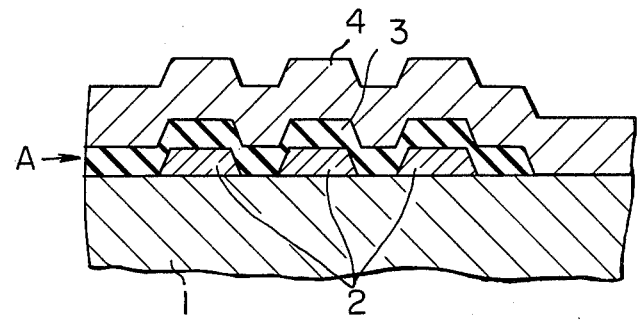
FIG. 2 is a sectional view taken on line II—II in FIG. 1.
Figure 3:
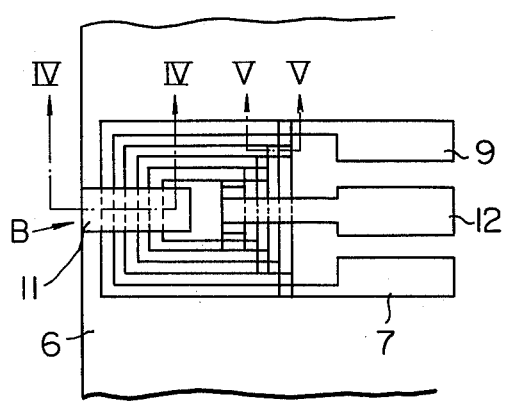
FIG. 3 is a plan view showing a schematic construction of another prior art thin-film magnetic head.
Figure 5:
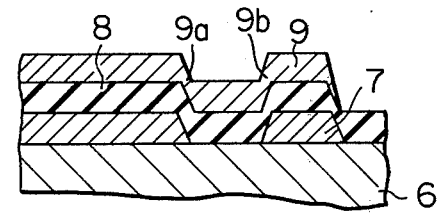
FIG. 5 is a sectional view taken on line V—V in FIG. 3.
Figure 4:
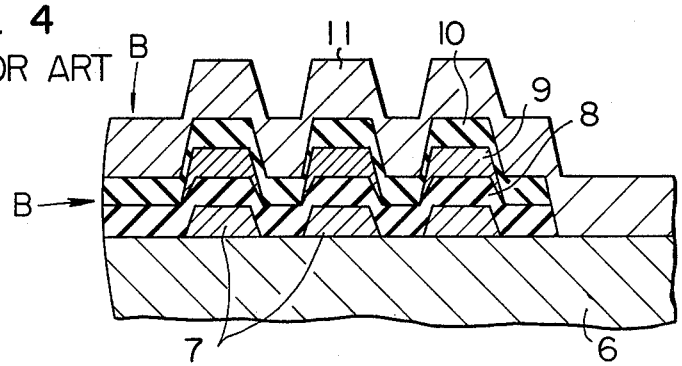
FIG. 4 is a sectional view taken on line IV—IV in FIG. 3.
Figure 6:
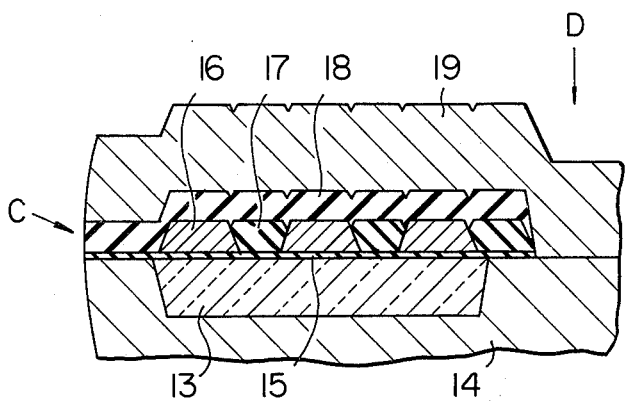
FIG. 6 is a sectional view showing one embodiment of this invention.

Referring now to FIG. 6, there is shown a thin-film magnetic head embodying this invention which comprises a magnetic substrate 14 of, for example, ferrite having a recess filled with glass 13, a non-magnetic insulating layer 15 of, for example, $SiO_2$ having a thickness of about 0.1 to 0.2 $\mu$m, a spiral pattern conductor layer 16 in the form of a three-turn coil which may be made of aluminum, a non-magnetic insulating layer 17 of SiO filling gaps between segments of the spiral pattern conductor layer 16 and being substantially flush with the layer 16, a non-magnetic insulating layer 18 which may be made of $SiO_2$, and a magnetic layer 19 of, for example, Ni-Fe alloy or Ni-Fe-Si alloy. These layers are stacked on the magnetic substrate 14 in the order mentioned above. The thin-film magnetic head of the above structure has a magnetic circuit formed therein having a gap C formed on one side of the magnetic head a magnetic recording medium (not shown) engages or passes in the vicinity of the head.

Figure 7:
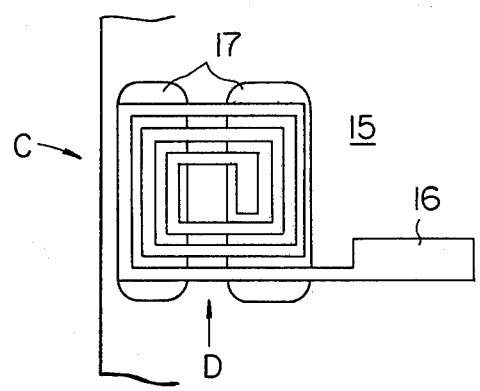
FIG. 7 is a plan view useful in explaining the fabrication of the FIG. 6 embodiment.

In fabricating the thin-film magnetic head described above, the non-magnetic insulating layer 15 is formed by vapor deposition or sputtering on the magnetic substrate 14 filled with glass 13, and the conductor layer 16 is formed by vapor deposition on the non-magnetic insulating layer 15. The conductor layer 16 is patterned into a desired configuration through photoresist and etching processes. After etching but before removal of photoresist, the non-magnetic insulating layer 17 is formed by vapor deposition wherein only portions of the layer 17 deposited on the pattern of the conductor layer 16 are removed along with photoresist. Thereafter, the non-magnetic insulating layer 18 and the magnetic layer 19 are successively formed by vapor deposition. Since SiO can be vapor deposited at relatively low temperatures without excessively solidifying photoresist, it is preferably used as a material for the non-magnetic insulating layer 17. The layer 17 must be filled at least in an area which is covered by the magnetic layer 19 but excludes a gap portion C and a back gap portion D, as shown in FIG. 7. In an area of the gap portion C, the non-magnetic insulating layer 17 may sometimes be deposited for adjustment of the gap width.

As described above, in the thin-film magnetic head in accordance with the foregoing embodiment, the non-magnetic insulating layer 17 is filled between pattern segments of the conductor layer 16 so that the magnetic layer 19 overlying the non-magnetic insulating layer 18 can be flattened, thereby eliminating the local decrease in cross-sectional area of the magnetic layer 19. As a result, magnetic saturation in the magnetic layer 19 can be prevented and a decrease in the permeability of the magnetic layer 19 can be suppressed to thereby improve recording and reproducing efficiencies. Since the above improvement can be attained without increasing the thickness of the magnetic layer 19, etching of the layer 19 is to obtain a narrow track width with high accuracy is easy. Moreover, the glass 13 filled in the recess of the magnetic substrate 14 is effective to extend the distance between the magnetic substrate 14 and the magnetic layer 19 opposing thereto interposing the conductor layer 16. This arrangement facilitates prevention of magnetic saturation and hence improves magnetic head efficiency. Furthermore, it should be understood that the non-magnetic insulating layer 15 deposited on the magnetic substrate 14 conditions uniformity of the substrate surface.

Figure 8:
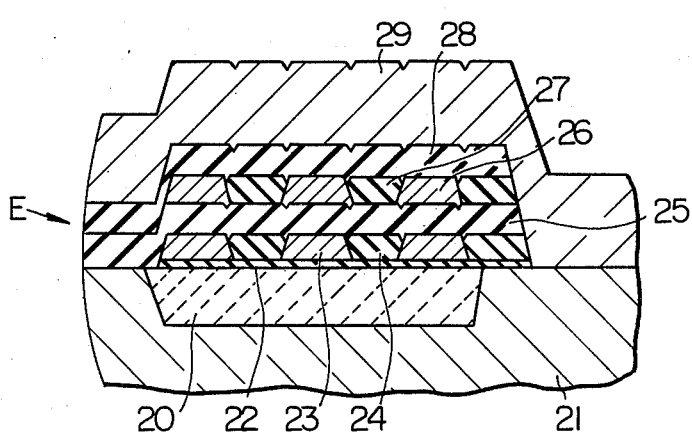
FIG. 8 is a sectional view showing another embodiment of this invention.

Turning to FIG. 8, a thin-film magnetic head according to another embodiment of this invention comprises a magnetic substrate 21 of, for example, ferrite having a recess filled with glass 20, a 0.1 to 0.2 $\mu$m thick non-magnetic insulating layer 22 of for example $SiO_2$, a spiral pattern conductor layer 23 in the form of a three-turn coil which may be made of aluminum, a non-magnetic insulating layer 24 of SiO filling the gaps between segments of the spiral pattern conductor layer 23 and being substantially flush with the layer 23, a non-magnetic insulating layer 25 of, for example, $SiO_2$, a spiral pattern conductor layer 26 in the form of a three-turn coil made of, for example, aluminum and being in register with the spiral pattern of the conductor layer 23, a non-magnetic insulating layer 27 of SiO filling the gaps between segments of the spiral pattern conductor layer 26 and being substantially flush with the layer 26, a non-magnetic insulating layer 28 of, for example, $SiO_2$, and a magnetic layer 29 of, for example, Ni-Fe alloy or Ni-Fe-Si alloy. These layers are stacked on the magnetic substrate 21 in the order mentioned above. The thin-film magnetic head of the above structure has a magnetic circuit with a gap E formed on one side of the magnetic head, a magnetic recording medium engaging or passing in the vicinity thereof.

Figure 9:
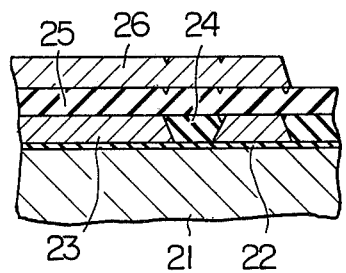
FIG. 9 is a sectional view showing a different part of the FIG. 8 embodiment.

This thin-film magnetic head is fabricated in the same way as the foregoing embodiment and it can remove irregularities in the magnetic layer surface corresponding to the conductor layer pattern, it can also eliminate magnetic saturation and suppress a decrease in permeability, thereby improving recording and reproducing efficiencies. In addition, as will be seen from FIG. 9, a segment of the conductor layer 26 crossing that of the conductor layer 23 can be flattened by the non-magnetic insulating layer 24 filled between pattern segments of the conductor layer 23 to make uniform the cross-sectional area of the conductor layer 26, thus balancing the resistances of the conductor layers 23 and 26 and making it easy to adjust a driving circuit for the magnetic head. The uniform cross-sectional area of the conductor layer 26 permits in increased allowable current and eliminates tendency to breakage.

The number of the conductor layers and the number of turn of the coils do not effect achievement of this invention. The foregoing embodiments are described by way of the magnetic substrate of ferrite formed with the recess in which glass is filled, but the invention is not limited thereby. The magnetic substrate according to the invention may include a non-magnetic substrate of, for example, Si, glass, barium titanate, Fotoceram or the like which is deposited with an Fe-Ni alloy or Fe-Si-Al alloy magnetic layer. The 0.1 to 0.2 $\mu$m thick, non-magnetic insulating layer deposited directly on the magnetic substrate is not essential in this invention and may be omitted. As shown in FIG. 6, the length of the gap C is defined by the sum of thicknesses of the non-magnetic layers 15 and 18 but it may be varied by suitable etching, partial vapor deposition or sputtering. As to the gap E in FIG. 8, which is defined by the thicknesses of the non-magnetic layers 25 and 28, the length of the gap E may also be varied in the same way. In other words, the non-magnetic layer 22 may be extended to constitute a part of the gap E, or the non-magnetic layer 25 may not exist in the gap E by removing by etching or partially vapor depositing or sputtering on the needed portion only, or the length of the gap E may be defined by only the thickness of the non-magnetic layer 28. As described above, this invention provides a thin-film magnetic head comprising a magnetic substrate; at least one layer deposited on the magnetic substrate and including a spiral pattern conductor layer in the form of a coil of two or more turns, a first non-magnetic insulating layer filling spaces between segments of the spiral pattern conductor layer and being substantially flush with the conductor layer, and a second non-magnetic insulating layer deposited on the conductor and first insulating layer; and a magnetic layer deposited on the laminar and forming a gap portion together with the magnetic substrate at one side of the magnetic head with which side a magnetic recording medium is in contact. The local decrease in cross-sectional area of the magnetic layer can be prevented and magnetic saturation and decrease in permeability can be suppressed, thereby considerably improving such magnetic head characteristics as recording and reproducing efficiencies.

We claim:

1. A thin-film magnetic head comprising:
   a magnetic substrate;
   a layer deposited on said magnetic substrate and including a spiral pattern conductor layer in the form of a coil of two or more turns, a first non-magnetic insulating layer filling gaps between segments of said spiral pattern conductor layer and being substantially flush with said conductor layer, and a second non-magnetic insulating layer deposited on said conductor and first insulating layer; and
   a magnetic layer deposited on said second non-magnetic layer and forming a gap portion together with said magnetic substrate on one side of the lamination thus formed, said one side being in contact with or in the vicinity of a magnetic recording medium.

2. A thin-film magnetic head according to claim 1 wherein said first and second non-magnetic insulating layers are made of SiO.

* * * * *